March 30, 1965   R. P. DE PUY   3,176,212
DIRECT CURRENT POWER SUPPLIES
Filed Dec. 19, 1958   2 Sheets-Sheet 1

Inventor:
Robert P. DePuy.
by J. Wesley Haubner
His Attorney.

Inventor:
Robert P. DePuy,
by His Attorney.

United States Patent Office 3,176,212
Patented Mar. 30, 1965

3,176,212
DIRECT CURRENT POWER SUPPLIES
Robert P. De Puy, Haddonfield, N.J., assignor to General
Electric Company, a corporation of New York
Filed Dec. 19, 1958, Ser. No. 781,762
10 Claims. (Cl. 321—8)

This invention relates to electrical power supply equipment and more particularly to power supplies whose output is controllable over a desired range.

An electrical circuit component recently added to the list of functional elements available to the electrical and electronic industries is a semi-conductor device now widely referred to as a controlled rectifier. The controlled rectifier is a three junction semi-conductor device whose reverse characteristic is similar to a normal semi-conductor rectifier in that it represents essentially an open circuit with negative anode to cathode voltage. The forward characteristic is such that it will block positive anode to cathode voltages below a critical breakover voltage if no signal is applied to the gate terminal. However, by exceeding the forward breakover voltage or applying an appropriate gate signal the device will rapidly switch to a conducting state and present the characteristicly low forward voltage drop of a single junction semi-conductor rectifier. The controlled rectifier behavior is similar in some respects to a gas thyratron. Like a thyratron, once the controlled rectifier has been fired by its control or gate element it can only be turned off by removal or reversal of the anode voltage. However, whereas thyratrons are triggered by a potential on the grid of the tube, the controlled rectifier is fired by current flowing through its gate element. Other characteristics which distinguish the controlled rectifier from the gas thyratron include much faster firing and recovery times on the order of a microsecond, very low potential drop when conducting, and, in general, those advantages inherent in the use of semi-conductor devices over heated cathode tubes.

The controlled rectifier consists basically of a four layer pnpn device with an ohmic connection to the center p region of the unit. The controlled rectifier blocks current flow in either direction until a critical forward breakover voltage is exceeded. At this voltage the center pn junction begins to avalanche. Current through the device increases rapidly until the current gain exceeds unity. This current level is relatively low. When reached and exceeded, it effectively reverses the bias of the center pn junction. Voltage across the device then becomes low and the current is limited essentially only by the series load impedance. The application of a gating signal to the ohmic connection switches the controlled rectifier from the non-conducting state to a conducting state without the necessity of exceeding the critical breakover voltage. The device can be fired by current pulses of extremely short duration.

Controlled rectifiers are currently expensive devices. They are likely to remain significantly more expensive than ordinary rectifiers because of the additional layers which must be formed in their manufacture. Although the usual intended use of controlled rectifiers in full wave direct current power supplies is as a combined rectifier and control element, in which case at least two controlled rectifiers are required, I have found it to be possible to achieve complete control of the output of a full wave or polyphase rectified direct current power supply by means of a single controlled rectifier used as a precision switching device only.

A principal object of this invention is therefore to provide a rectified direct current power supply whose output is regulated by controlled rectifier means in only one branch of the power supply circuit, thereby achieving all the major advantages of controlled rectifier regulation with the smallest possible investment in controlled rectifier equipment.

By way of a brief summary of but one form of the present invention I provide a direct current power supply connected to receive operating potentials from a single phase alternating current source. The power supply comprises a full wave rectifier connected to transform the alternating current input into a full wave rectified output. According to these teachings a controlled rectifier is connected in one of the output connections of the rectifier bridge in series with a load. A phase controlled gating circuit is arranged to provide a control pulse to the gate electrode of the controlled rectifier at intervals related to the phase of the supply potential. After the first control pulse has been applied, the gating circuit might ordinarily lose control of the controlled rectifier because of the tendency of the latter to continue to conduct after it has fired. To cause a commutating action, that is a cessation in the conduction of current by the controlled rectifier, and thereby to permit the gating circuit to regain control cyclically of the power supply output, means are provided in some embodiments of these teachings to insure that even if the output potential of the power supply does not decline to zero periodically, at least the potential across the controlled rectifier drops to zero or reverses polarity periodically. This latter means in most embodiments takes the form of a circuit element exerting a reverse potential on the output side of the controlled rectifier so that the periodic variation or ripple content of the rectified direct currents on the input side of the controlled rectifier causes a reversal of polarity across the controlled rectifier periodically cutting off conduction in this element. Because the ripple content of the currents passing through the controlled rectifier have a functional effect on the regulation provided by the controlled rectifier no attempt is made to smooth the current flow through the controlled rectifier and any capacitive filter which is provided is placed on the output side of the controlled rectifier element.

Although the scope of this invention is not to be limited except by a fair interpretation of the appended claims further details of the invention as well as additional objects and advantages will be better understood in connection with the accompanying drawings wherein:

Figure 1:
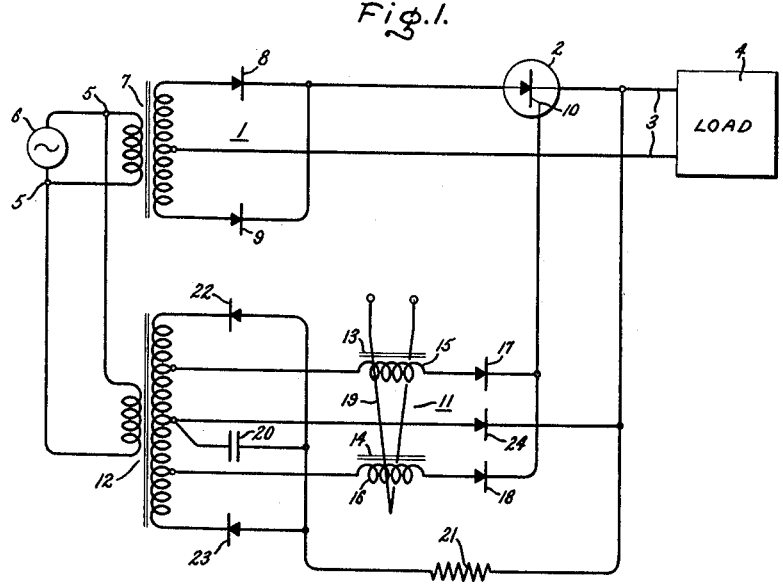
FIG. 1 is a schematic diagram of a direct current power supply utilizing a single phase full wave rectifier constructed in accordance with these teachings.

The power supply shown in FIG. 1 includes a full wave rectifier shown generally at 1, a controlled rectifier 2 and output leads 3 for delivering controlled amounts of direct current to a load 4. The full wave rectifier is energized at its terminals 5 from a source 6 of single phase alternating current supply. The alternating current supply is coupled through transformer 7 and converted into full wave rectified direct currents by the rectifying elements 8 and 9. But for the controlled rectifier 2, the entire output of the full wave rectifier would be delivered to the load 4. However, as stated above, the controlled rectifier possesses the ability to block current flow in either direction therethrough until a gating signal of a predetermined magnitude is applied to its gate electrode 10. Without such a gating signal no current can be delivered to the load circuit.

The means for providing the gating signal shown in the embodiment illustrated in FIG. 1 takes the form of an amplistat 11 energized from the same source 6 which supplies operating potentials to the full wave rectifier, although many other means for supplying a pulsed gating signal may also be employed. The amplistat includes a center tapped power transformer 12, two saturable cores 13 and 14 each provided with its own alternating current winding 15 and 16 respectively and two rectifiers 17 and 18, one in series with each winding. A control winding 19 links both saturable cores. Blocking rectifiers 17 and 18 permit only unidirectional current flow in the windings 15 and 16 and each core controls the load current of the amplistat on alternate half cycles.

At the start of the alternating current supply cycle, current will flow in only one of the windings 15 and 16. As the potential builds up in the positive direction, current will begin to flow through one of the rectifiers 17 or 18 and into the gating circuit of the controlled rectifier. This initial current is insufficient to fire the controlled rectifier since it is limited to a very small value by the large inductance of the associated winding which continues to be large only so long as the saturable core maintains a high permeability. When the core becomes saturated the alternating current windings no longer limit the current in the circuit and the current output of the amplistat will immediately rise to a comparatively large value sufficient to fire the controlled rectifier. During the remainder of the cycle the current produced by the amplistat through the gating circuit of the controlled rectifier is substantially constant. To provide a constant current output the amplistat includes a filtered direct current source comprising capacitor 20 with resistor 21 in series therewith to limit the current to a desired level. The transformer 12 and its associated rectifiers 22 and 23 place a nearly constant potential upon the capacitor which is preferably several times higher than the potential applied to amplistat windings 15 and 16. Instead of connecting the amplistat to the center tap of the transformer as is customary, a blocking rectifier 24 is included to send the pulsed output through resistor 21. When the amplistat does fire the current source, i.e., capacitor 20, provides most of the current output, which is substantially proportional to the constant potential on the capacitor. By varying the current to the control winding 19, the firing point of the amplistat can be controlled since with a resistive load the firing angle is a substantially linear function of the control signal applied.

Figure 2:
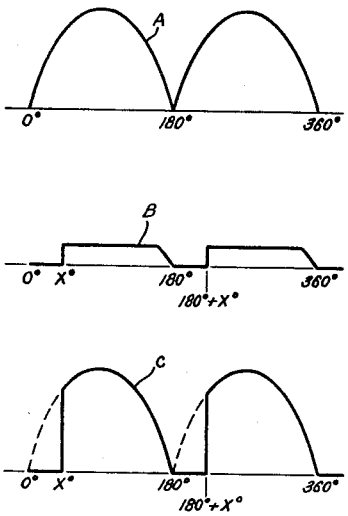
FIG. 2 is a graphical representation of the potentials and currents at different points in the circuit shown in FIG. 1.

The manner in which the output or load circuit currents are controlled may be visualized in connection with FIG. 2 which shows the nature of some wave forms present in the power supply. To begin with, curve A illustrates the direct current potential output of the full wave rectifier as it appears at the anode of the controlled rectifier. This curve is, of course, idealized and is an accurate representation only if it is assumed that the load 14 has substantially no inductance present in it. At any rate, the full wave rectified direct current potentials shown by curve A have a substantial ripple content which causes a periodic decline in the potential output of the full wave rectifier to zero. According to these teachings the ripple content of the full wave rectified direct currents is made use of to help effect control of the actual amounts of direct current delivered to the load circuit. The solid line of curve B illustrates the wave shape of the currents applied by the amplistat to the gate electrode of the controlled rectifier. This curve has a steep leading edge which occurs at the moment represented by X° when one or the other of the amplistat cores saturates. By increasing or decreasing the level of the control signal applied to the control winding of the amplistat the phasing or firing angle at which the steep front of wave B occurs may be varied substantially between zero degrees and 180 degrees to control the instant at which the controlled rectifier is caused to conduct. In this respect the leading edge of the amplistat output signal B is of most importance, since once the controlled rectifier has begun to conduct the gate signal no longer has any effect on the controlled rectifier conductance.

Curve C illustrates in solid lines the potentials on the load side of the controlled rectifier and in dotted lines that portion of the full wave rectified direct current potentials blocked by the controlled rectifier. As soon as the controlled rectifier is triggered into a conducting state by the pulsed gating signal, it permits the full current output of the full wave rectifier to pass through it, with a comparatively insignificant IR drop across the controlled rectifier. Thereafter the wave shape on the load side of the controlled rectifier is substantially identical to that of the full wave rectifier output until at the end of a half cycle both the direct current output signals and the gate signal drop to zero. At this instant represented on the curves by the 180 degrees point, with no potential across the controlled rectifier and no current applied to the gate electrode, the controlled rectifier ceases to conduct and the next half cycle is a repetition of the preceding one. It should be noted that the commutating effect in this example is supplied by the pulsations in the full wave rectified direct currents. If the current through the controlled rectifier did not decline substantially to zero the controlled rectifier would continue to be conductive, acting more or less like a closed switch which could not be opened, and would exert no further control over the output of the power supply.

Actually, only in the comparatively rare instances when only negligible inductive reactances are present either in the power supply or in the load circuit would the potential of the full wave rectified direct currents drop to zero to cause a commutating action to take place in the controlled rectifier. In a polyphase rectifier, furthermore, the rectified direct currents would never drop to zero whether the load were purely resistive or not. Nevertheless, I have found it possible to effect control of the output of such rectifiers by means of a controlled rectifier even in those instances when the output of the rectifier does not periodically decline to zero.

Figure 3:
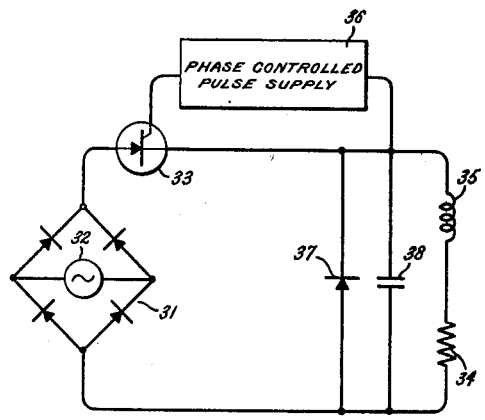
FIGS. 3 through 6 are schematic diagrams of alternative embodiments of the present invention illustrating different arrangements for producing a back electromotive force on the controlled rectifier.

One embodiment in which such a control is exerted is shown in FIG. 3. This circuit incorporates a bridge-connected full wave rectifier 31 energized from a source 32 of single phase alternating current and arranged to have its direct current output delivered through controlled rectifier 33 to a load circuit shown schematically as including a resistance 34 and an inductance 35. These latter circuit elements are intended to represent resistive and inductive effects in the load circuit rather than specific circuit elements. To control the currents actually delivered to the load circuit a phase-controlled gating signal supply 36 is connected between the gate electrode and the cathode of the controlled rectifier. This supply, shown in block form in FIG. 3, is intended to accomplish the same functions performed by the amplistat of FIG. 1. Toward this end the gating signal supply 36 may actually be an amplistat or it may be a sharp pulse producing circuit of any known type with provisions for shifting the phase of the pulsed signal.

Once current flow through the controlled rectifier has been initiated by a pulse supplied by the signal supply 36, the inductive effects present in the load circuit will tend to maintain some current flow in the circuit at all times. Hence, the full wave rectified direct currents will not of their own accord drop to zero to cause a commutating action in the controlled rectifier. To achieve the commutating effect and thereby to permit the signal supply to maintain control over the output of the power supply, the circuit shown in FIG. 3 makes use of a commutating rectifier 37 and a capacitor 38 connected in parallel with the load to produce a back electromotive force on the controlled rectifier. The rectifier 37 provides a path for the inductive current to circulate and the capacitor tends to maintain a reasonably constant potential on the load side of the controlled rectifier. The capacitor produces a counter electromotive force on the load side of the controlled rectifier which, in concert with the cyclic variations on the input side, causes a periodic interruption in current flow through the controlled rectifier. Since this is all that is needed to convert the controlled rectifier to a current-blocking condition, the gating circuit regains control over the controlled rectifier and may initiate current conduction therethrough once again at controllable intervals. If the gating pulse is sufficiently sharp it is possible by such a scheme to vary the output of the power supply over substantially the entire range of from zero percent to 100 percent of the full wave rectifier output.

Figure 4:
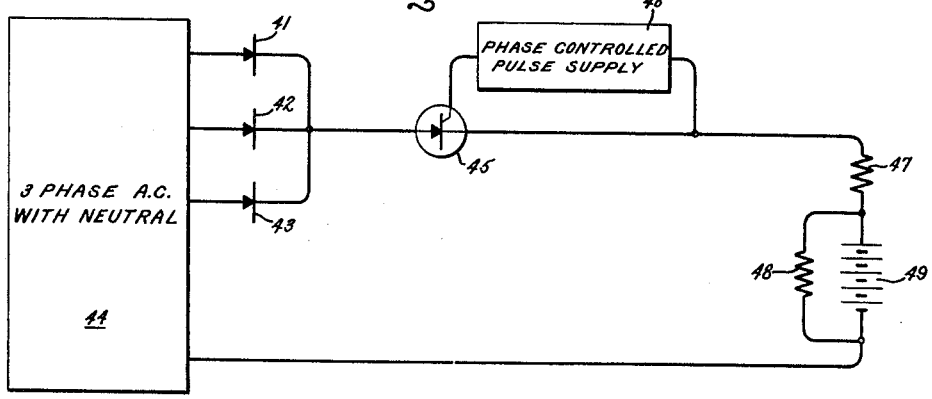
Figure 5:
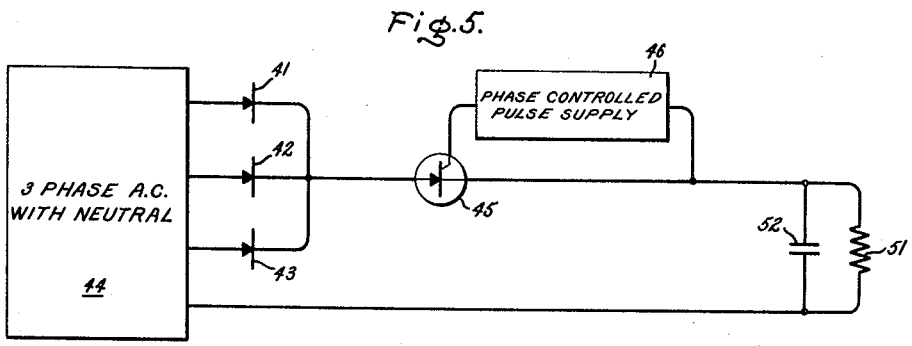
Figure 6:
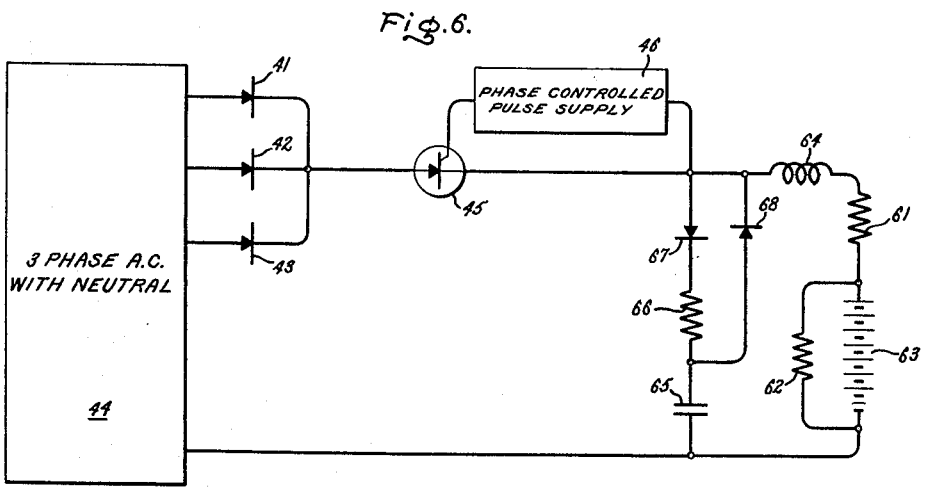

Each of the circuits shown in FIGS. 4 through 6 includes a half wave polyphase rectifier of three rectifying elements 41, 42 and 43 supplied with operating potentials from a 3-phase source of alternating current supply 44. As in the previous examples a controlled rectifier 45 is connected in series with and in between the full wave rectifier and the load circuit, and is gated by a phase controlled gating signal supply 46. These common elements of the circuits are identified by the same numerals in each of the figures but the load circuits in each case are different. For example, the load circuit of FIG. 4 is shown as containing a resistance 47 in series with a parallel combination of resistor 48 and a source 49 of unidirectional electromotive force. This load circuit is intended to be a schematic illustration of a typical load having a back electromotive force such as that encountered in battery charging applications. The back potential in the load itself in concert with the cyclic variations in the 3 phase half wave rectified output of the rectifier provides the commutating potential to permit the phase controlled gating signal supply to maintain control over the controlled rectifier and hence to control the output of the power supply.

FIG. 5 illustrates a power supply of the character shown in FIG. 4 working into a substantially pure resistive load 51. Because of the nature of the 3-phase full wave rectified direct current wave shape, the direct current output would not ordinarily decline to zero. Without more, the gating signal supply 46 of FIG. 5 would be capable only of turning on 100 percent of the available power to the load but would be incapable of turning it off or of controlling the output. To permit it to exercise this control the capacitor 52 is inserted in the load circuit in parallel with the resistive load to produce a counter electromotive force and thereby to cause the commutating action previously described.

FIG. 6 illustrates another 3 phase excited power supply circuit but having a filtered output and a load similar to that shown in FIG. 4 which in operation exerts a back potential. A typical application of this circuit would be for charging batteries and resistors 61 and 62 represent the internal resistances of a battery 63. To filter the charging currents a choke 64 is inserted in series with the load and a capacitor 65 in shunt. The resistor 66 and the rectifier 67 in series therewith are employed to control the charging rate of the capacitor. When the direct current output through the controlled rectifier declines periodically due to the ripple content a discharge path is provided for inductive currents of the choke from the capacitor 65 through the unidirectional rectifier 68 and the load circuit. The resonant frequency of the choke-capacitor combination should, of course, be substantially lower than the ripple frequency in the direct current output.

These examples of power supplies utilizing a controlled rectifier for control of their output have been offered by way of illustration of the principles governing the application of this disclosure. Other variations within the scope of these teachings will doubtless occur to those skilled in the art to which the present invention pertains. For example, although but a single controlled rectifier has been shown to control the output of each of the power supplies illustrated herein, it will readily be appreciated that where the load demands currents in excess of the current rating of one controlled rectifier it will often be essential to provide two or more of these elements in parallel with each other. I therefore wish it to be understood that the appended claims are intended to cover all such modifications as fall within the true spirit and scope of this invention.

What I claim as new and desire to secure by Letters Patent of the United States is:

1. A power supply comprising: in combination a source of periodically varying electrical currents; diode rectifier means connected to said source and having output terminals to provide unidirectional output currents having significant ripple content; controlled rectifier means connected in series with one of said output terminals and with a load circuit connected across said output terminals such that the ripple content of said output current causes the potential across said controlled rectifier means periodically to decline at least to a level sufficient to cause an interruption in the conduction of said output current by said controlled rectifier means; and gating means for providing a phase-controlled gate signal to said controlled rectifier means.

2. A direct current power supply comprising a full wave diode rectifier for providing a direct current output having significant ripple content when energized from a source of alternating current; and means for delivering said direct current output to a load; and means for controlling the amount of said direct current output delivered to said load including at least one controlled rectifier connected in series with said full wave rectifier and with said delivering means such that the ripple content of said output causes the potential across said controlled rectifier periodically to decline at least to zero, and gating means for providing a periodic phase-controlled gate signal to said controlled rectifier to initiate current conduction by it of said direct current output.

3. A direct current power supply comprising a polyphase diode rectifier for providing a direct current output having significant ripple content when energized from a source of polyphase alternating current; and means for delivering said direct current output to a load; and means for controlling the amount of said direct current output delivered to said load including at least one controlled rectifier connected in series with said polyphase rectifier and with said delivering means such that the ripple content of said output causes the potential across said controlled rectifier periodically to decline at least to zero, and gating means for providing a periodic phase-controlled gate signal to said controlled rectifier to initiate current conduction by it of said direct current output.

4. A direct current power supply comprising: an input circuit for connection to a source of alternating current; diode rectifying means for transforming alternating currents in said input circuit into rectified direct currents having significant ripple content; a load circuit for receiving said direct currents; at least one controlled rectifier interposed in series with and in between said rectifying means and said load circuit; gating means for providing a periodic phase-controlled gating signal to said controlled rectifier to initiate current conduction by it of said direct currents; and means in said load circuit for producing a unidirectional back electromotive force on said controlled rectifier, whereby the ripple content of said direct currents causes the potential across said controlled rectifier periodically to decline to a level sufficient to cause an interruption in the conduction of said direct currents by said controlled rectifier.

5. In combination: supply terminals for connection to a source of alternating electric current supply; diode rectifier means connected to said terminals for producing direct currents having significant ripple content; an output circuit; and means for delivering predetermined amounts of said direct currents to said output circuit including at least one controlled rectifier connected in series with said rectifier means and said output circuit, gating means for providing a periodic phase-controlled gating signal to said controlled rectifier to initiate current conduction by it of said direct currents, whereby the ripple content of said direct currents causes the potential across said controlled rectifier periodically to decline at least to zero to cause commutation of current conduction by said controlled rectifier.

6. In combination: supply terminals for connection to a source of alternating electric current supply; a full wave diode rectifier connected to said terminals for producing direct currents having significant ripple content; an output circuit; and means for delivering predetermined amounts of said direct currents to said output circuit including at least one controlled rectifier connected in series with said full wave rectifier and said output circuit, gating means for providing a periodic phase-controlled gating signal to said controlled rectifier to initiate current conduction by it of said direct currents, and means in said output circuit for producing a unidirectional back electromotive force on said controlled rectifier, whereby the ripple content of said direct currents casues the potential across said controlled rectifier periodically to decline at least to zero to cause commutation of current conduction by said controlled rectifier.

7. In combination: supply terminals for connection to a source of alternating electric current supply; a polyphase diode rectifier connected to said terminals for producing direct currents having significant ripple content; an output circuit; and means for delivering predetermined amounts of said direct currents to said output circuit including at least one controlled rectifier connected in series with said polyphase rectifier and said output circuit, gating means for providing a periodic phase-controlled gating signal to said controlled rectifier to initiate current conduction by it of said direct currents, and means in said output circuit for producing a unidirectional back electromotive force on said controlled rectifier, whereby the ripple content of said direct currents causes the potential across said controlled rectifier periodically to decline at least to zero to cause commutation of current conduction by said controlled rectifier.

8. In combination a controlled rectifier having a cathode, an anode and a gate electrode and possessing the ability to block current flow in either direction therethrough until a gating signal of predetermined current magnitude is applied to said gate electrode; diode rectifying means having input terminals for connection to a source of alternating current and output connections blocked by said controlled rectifier when in a non-conducting state for delivering direct currents having significant ripple content; an output circuit for delivering the direct currents passed by said controlled rectifier to a load; and means for controlling the amounts of said direct currents passed by said controlled rectifier comprising gating means for providing a periodic phase-controlled gating signal to said gate electrode to initiate current conduction in said controlled rectifier, whereby the ripple content of said direct currents causes the potential across said controlled rectifier periodically to decline at least to zero to cause commutation of current conduction by said controlled rectifier.

9. In combination a controlled rectifier having a cathode, an anode and a gate electrode and possessing the ability to block current flow in either direction therethrough until a gating signal of predetermined current magnitude is applied to said gate electrode; a full wave diode rectifier having input terminals for connection to a source of alternating current and output connections blocked by said controlled rectifier when in a non-conducting state for delivering direct currents having significant ripple content; an output circuit for delivering the direct currents passed by said controlled rectifier to a load; and means for controlling the amounts of said direct currents passed by said controlled rectifier comprising gating means for providing a periodic phase-controlled gating signal to said gate electrode to initiate current conduction in said controlled rectifier, and means in said output circuit for producing a unidirectional back electromotive force on said controlled rectifier, whereby the ripple content of said direct currents causes the potential across said controlled rectifier periodically to decline at least to zero to cause commutation of current conduction by said controlled rectifier.

10. In combination a controlled rectifier having a cathode, an anode and a gate electrode and possessing the ability to block current flow in either direction therethrough until a gating signal of predetermined current magnitude is applied to said gate electrode; a polyphase diode rectifier having input terminals for connection to a source of polyphase alternating current and output connections blocked by said controlled rectifier when in a non-conducting state for delivering direct currents having significant ripple content; an output circuit for delivering the direct currents passed by said controlled rectifier to a load; and means for controlling the amounts of said direct currents passed by said controlled rectifier comprising gating means for providing a periodic phase-controlled gating signal to said gate electrode to initiate current conduction in said controlled rectifier, and means in said output circuit for producing a unidirectional back electromotive force on said controlled rectifier, whereby the ripple content of said direct currents causes the potential across said controlled rectifier periodically to decline at least to zero to cause commutation of current conduction by said controlled rectifier.

References Cited by the Examiner
UNITED STATES PATENTS

| | | | |
|---|---|---|---|
| 2,471,826 | 5/49 | Lord | 315—194 |
| 2,693,568 | 11/54 | Chase | 323—22 |
| 2,772,387 | 11/56 | Liguori | 321—18 |
| 2,786,966 | 3/57 | Taylor | 315—194 X |
| 2,786,967 | 3/57 | Kuenning | 315—194 X |
| 2,885,621 | 5/59 | Brown | 321—18 |
| 2,936,413 | 5/60 | Searcy | 323—22 |

OTHER REFERENCES

"Solid-State Thyratron Switches Kilowatts," by R. P. Frenzel and F. W. Gutzwiller, published by Electronics (March 28, 1958), pages 52–55 relied on.

LLOYD McCOLLUM, *Primary Examiner.*

RALPH G. NILSON, SAMUEL BERNSTEIN,
*Examiners.*